May 8, 1951                      F. G. LOVE                     2,551,890
GAS SCRUBBER
Filed Aug. 18, 1950                                   2 Sheets—Sheet 1
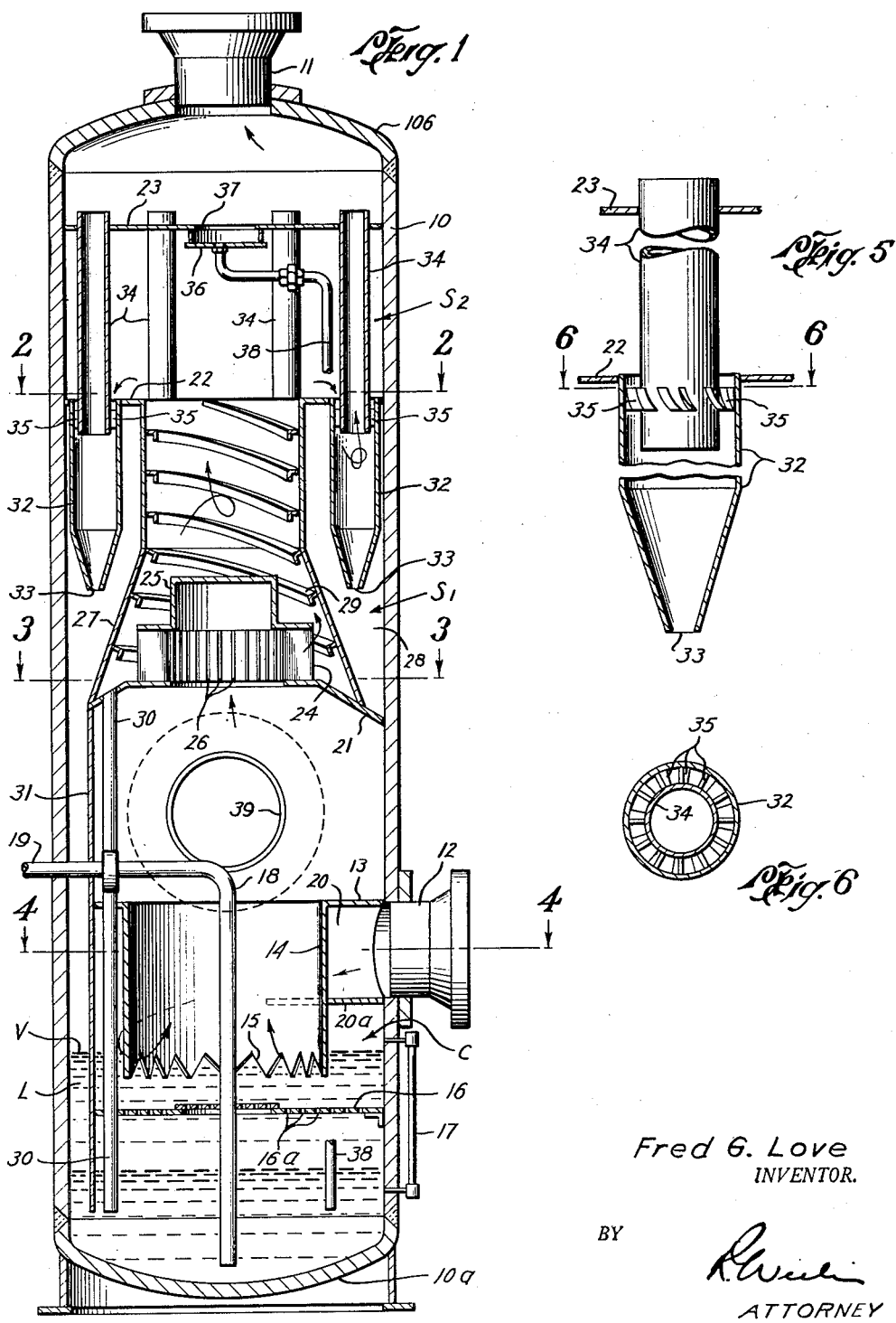
Fred G. Love
INVENTOR.
BY
*R. Wili*
ATTORNEY May 8, 1951     F. G. LOVE     2,551,890
GAS SCRUBBER
Filed Aug. 18, 1950     2 Sheets-Sheet 2
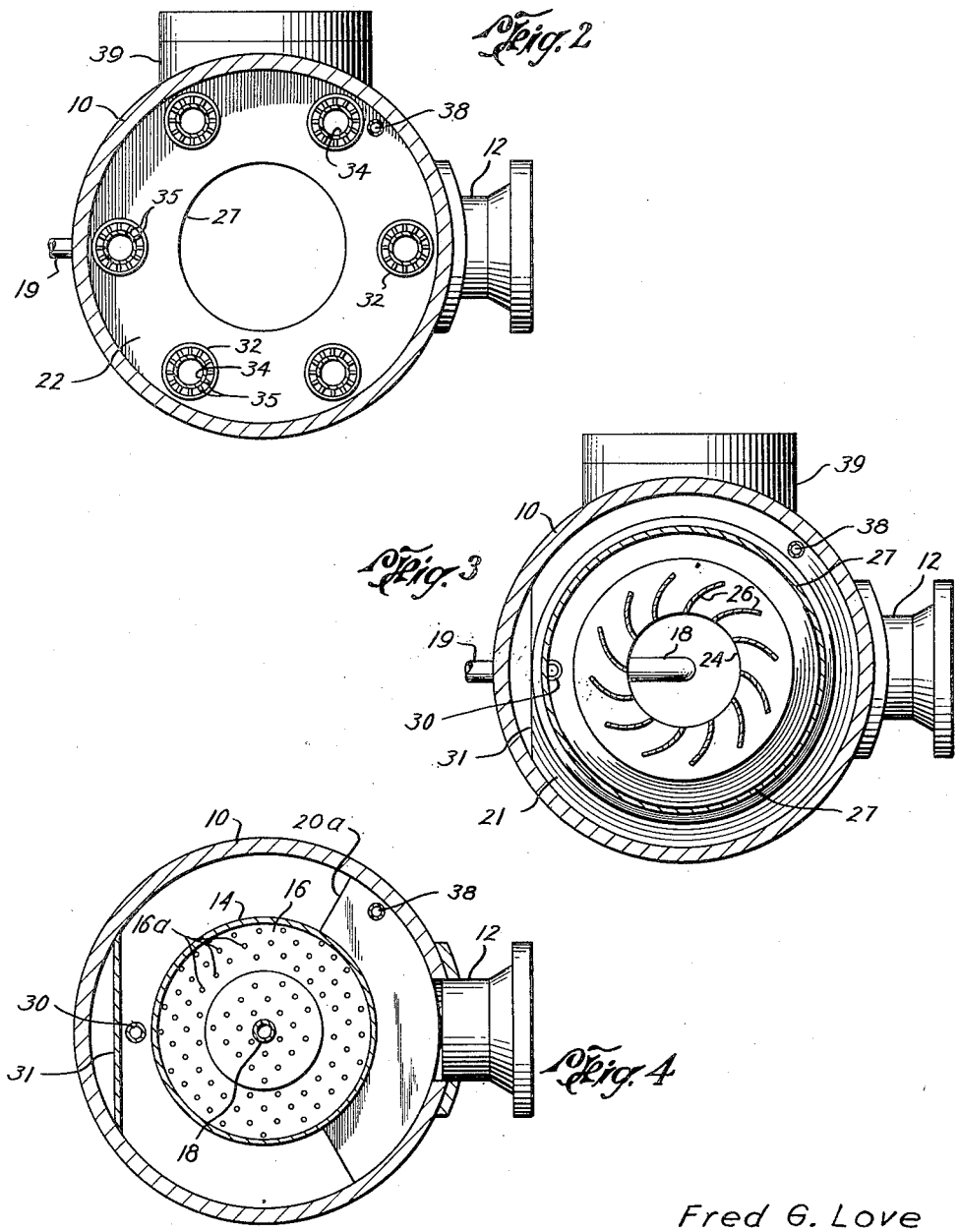
Fred G. Love
INVENTOR.
BY
ATTORNEY Patented May 8, 1951

2,551,890

UNITED STATES PATENT OFFICE 2,551,890

GAS SCRUBBER

Fred G. Love, Houston, Tex., assignor to Packaged Gas Equipment Corporation, Houston, Tex., a corporation of Texas Application August 18, 1950, Serial No. 180,151

6 Claims. (Cl. 183—22)

This invention relates to gas scrubbers and particularly to scrubbers of the type in which a stream of gas, such as natural gas, is intimately contacted with a suitable scrubbing liquid, such as a hydrocarbon oil, for the purpose of removing entrained detritus, such as dirt, line scale, water and other foreign matter.

Gas scrubbers of the type mentioned are conventionally installed at intervals along natural gas pipe lines in order that the gas may be cleaned of the entrained foreign matter before proceeding along the next interval of its journey through the pipe line. The gas is normally contacted with a suitable scrubbing liquid contained in the scrubber, and while this treatment is ordinarily very efficient in effecting removal of the entrained matter from the gas, some of the scrubbing liquid will, in turn, become entrained in the gas and unless removed, will be carried out of the scrubber by the gas stream, resulting both in loss of the scrubbing liquid and various other well-known undesirable results arising from the presence of the scrubbing liquid in the gas stream. The large volume and relatively high pressures of the gas in the usual gas pipe line greatly aggravates the carry-over conditions. Conventional scrubbers provide various "knock-back," mist-extraction, or other well known devices to obviate this condition but these are often relatively inefficient and may produce extensive and undesirable pressure drops in the gas stream.

Accordingly, a primary object of this invention is to provide a gas scrubber which is adapted to handle large volumes of gas at high pressures with minimum loss of pressure; which provides effective scrubbing contact of the gas with a scrubbing liquid; and which provides highly efficient extraction of entrained scrubbing liquid from the gas.

An important object is the provision of a scrubbing vessel having a gas-liquid scrubber section and a plurality of gas-liquid separator sections in which improved flow-directing and baffling devices are arranged in the path of the scrubbed gas to effectively remove entrained scrubbing liquid with minimum pressure drop.

Other and more specific objects and advantages of this invention will become readily apparent from the following detailed description when read in conjunction with the accompanying drawings which illustrate one useful embodiment in accordance with this invention.

In the drawings:

Fig. 1 is a longitudinal sectional view of a gas scrubber in accordance with one embodiment of this invention;

Fig. 2 is a cross-sectional view along line 2—2 of Fig. 1;

Fig. 3 is a cross-sectional view along line 3—3 of Fig. 1;

Fig. 4 is a cross-sectional view along line 4—4 of Fig. 1;

Fig. 5 is a longitudinal partly sectional view of one element of the scrubber structure; and Fig. 6 is a cross-sectional view along line 6—6 of Fig. 5.

Referring to the drawings, the scrubber comprises an elongated tubular shell 10, adapted to be vertically disposed, constructed of metal having a wall thickness sufficient to withstand the internal pressures to which it may be subjected in operation. The lower end of shell 10 is closed by a dished head 10a and the upper end is provided with a head 10b having a gas discharge connection 11 communicating with the interior of the shell at its upper end. A gas inlet connection 12 communicates with the interior of shell 10 through the side thereof at a suitable point, generally about one-third the length of the shell above the bottom. A partition plate 13 extends transversely across the interior of the shell just above inlet connection 13. The portion of the shell below partition plate 13 may be generally termed the "contactor section," and is designated generally by the letter C. A relatively large diameter tubular chimney 14 extends downwardly through plate 13 to an intermediate point in the contactor section and provides communication between the sections of the shell on opposite sides of plate 13. The lower edge of chimney 14 may be provided with serrations 15 of any suitable form. A baffle plate 16, having a large number of generally uniformly spaced perforations 16a therein (see Fig. 4), is arranged transversely of shell 10 below the lower end of chimney 14. A conventional gauge glass 17 is arranged on the outside of the shell opposite the contactor section to indicate the level of a body of scrubbing liquid to be maintained therein. A pipe 18 for introduction and removal of scrubbing liquid extends through chimney 14 from a point adjacent the lower end of the shell and communicates with the exterior of the shell through a nozzle 19 located just above partition plate 13. The inner end of inlet connection 12 is connected to an inlet nozzle 20 which communicates with the annular space between the shell and the exterior of chimney 14. The upper wall of the nozzle is formed by partition plate 10 and the lower wall is formed by an arcuate plate 20a which extends for a short distance on opposite sides of the axis of inlet connection 12. The side walls of the nozzle will, of course, be formed by the concentric walls of shell 10 and chimney 14. This arrangement serves to impart a downward swirling movement to gas discharging from the nozzle, as indicated by the arrows in Fig. 1, the gas flowing in opposite directions about chimney 14.

A pair of longitudinally spaced partition plates 21 and 22 are arranged in an intermediate portion of shell 10 above plate 13 and enclose between them a section, designated generally by the letter S₁, which is termed the "primary separator section." An additional partition plate 23 extends across the shell a substantial distance above plate 22 and near the upper end of shell 10 and the section enclosed between plates 22 and 23 is termed the "secondary separator section" and is designated generally by the letter S₂.

A short centrifugal nozzle 24 is mounted in plate 21 to provide communication between the portion of the shell below plate 21 and the interior of primary separator section S₁. The upper end of nozzle 24 is closed by means of a domed cover 25, and the periphery of nozzle 24 is formed by a plurality of vertically extending, radially spaced, arcuate vanes 26 which are disposed about the axis of the nozzle to provide means for radial discharge of gas from the nozzle and to impart a centrifugal component to the gas flowing through nozzle 24 into the interior of primary contactor section S₁. (Figs. 1 and 3.)

An upwardly tapering generally conical hood 27 is set over nozzle 24 in co-axial alignment therewith. The base of the hood is seated on plate 21 and its diameter is made somewhat less than that of the interior of the shell and is thereby annularly spaced therefrom, forming a generally annular space 28 within primary separator section S₁ between the exterior of the hood and the surrounding portion of shell 10. The upper end of hood 27 is open and communicates through plate 22 with the interior of secondary separator section S₂. A helical baffle 29 is mounted on the inner wall of hood 27 and extends from its apex to its base. Baffle 29 is conveniently constructed of angle iron having the edge of one flange welded or otherwise fixedly attached to the inner wall of the hood and the other flange in depending position and spaced inwardly from the wall of the hood, substantially as shown. A downcomer 30 communicates with the interior of hood 27 through plate 21 and extends downwardly through shell 10 to a point in contactor section C near its lower end. A second downcomer 31 communicates through plate 21 with the space 28 and also extends downwardly through the shell to a point in contactor section C near its lower end.

A plurality of angularly spaced tubular nozzles 32 depend from plate 22 into space 28, and are adapted to provide communication between the interior of secondary separator section S₂ and space 28. The lower ends of nozzles 32 are reduced in diameter to provide openings 33 of comparatively restricted area communicating with space 28. Tubular risers 34 of smaller diameter than nozzles 32 are arranged co-axially therewith and have their lower ends extending into the bores of the corresponding nozzles 32 to a point somewhat below the upper ends of these nozzles, and having their upper ends extending through, and somewhat above, plate 23 into communication with the space above plate 23. A plurality of helical vanes 35 are arranged in the annular spaces between the lower ends of risers 34 and the surrounding walls of nozzles 32 (see Figs. 5 and 6).

A well 36 is provided below an opening 37 in the center of plate 23 to collect any liquid which may deposit on top of plate 23. A downcomer 38 is connected into the bottom of well 36 and extends downwardly through shell 10 into the lower portion of contactor section C. A manhead 39 of any conventional form is provided at one side of shell 10 to permit access to the interior thereof.

The scrubber above-described operates in the following manner: A quantity of a suitable scrubbing liquid L will first be introduced into contactor section C through pipe 16, via nozzle 19, in an amount to attain a level V such that the lower end of chimney 14, including serrations 15, will be submerged within the liquid. The open lower ends of downcomers 30, 31 and 38 will likewise be submerged in the body of liquid L to thereby form a liquid seal therefor.

A stream of gas to be cleaned will be introduced into contactor section C through inlet connection 12 and, by virtue of the shape of nozzle 20, will be caused to follow a generally tangential path before coming in contact with the scrubbing liquid, which imparts a centrifugal component to the gas stream tending to throw out some of the detritus carried by the gas. The pressure of the gas will normally be relatively high and will flow through the scrubber at relatively high velocities. The gas then contacts the scrubbing liquid and is forced to pass therethrough to reach chimney 14. In passing into chimney 14 the gas must pass through serrations 15 which, by reason of their form and arrangement, provide a relatively large amount of surface for effecting efficient scrubbing contact of the gas by the scrubbing liquid. Perforated baffle plate 16 serves as an additional contactor means and prevents the formation of eddy pockets in the surface of the liquid due to the whirling action and velocity of the gas. The path of flow of the gas through the contactor section is indicated generally by the arrows appearing in Fig. 1. This liquid-gas contact will serve to effectively scrub the gas and remove substantially all of the foreign matter, including any water droplets carried thereby. This foreign matter will be deposited in the body of the liquid L and when the latter has become sufficiently dirty, it may be withdrawn through pipe 18 and replaced by fresh scrubbing liquid. Any water so-removed from the gas will collect in the lower portion of the contactor section and may also be removed from time to time through pipe 18. It will be understood that various conventional means may be employed for removal and replacement of the scrubbing liquid and to maintain the desired level thereof in the contactor section. This may be accomplished continuously or intermittently in any well known manner.

The gas, although now substantially free of originally contained foreign matter will, as a result of the described contact with the scrubbing liquid, necessarily absorb and entrain substantial quantities of the scrubbing liquid which must be removed to obviate the undesirable results mentioned earlier. The gas carrying scrubbing liquid flows upwardly and out of contactor section C through chimney 14 toward primary separator section S₁. The gas will enter the latter at its center through nozzle 24 and will be discharged radially therefrom beneath hood 27. Vanes 26 will cause the gas to discharge generally tangentially along the inner surface of hood 27 and with a substantial centrifugal component which tends to throw out the particles of scrubbing liquid carried by the gas. The gas will flow upwardly in a helical path along the inner wall of hood 27 where it will repeatedly contact the several successive convolutions of helical baffle 29, the gas following the generally upward swirling path indicated by the arrows. The pitch of helical baffle 29 is preferably made opposite that of the path of flow of the gas to increase the baffling effect. The contact of the gas with the baffle and the centrifugal force imparted to the stream will knock-out or separate the major portion of the contained liquid from the gas, the particles of separated liquid depositing on the surfaces of the baffle and inner wall of the hood and draining downwardly along these surfaces to the top of plate 21 whence, the liquid so-separated will flow through downcomer 30 back into the body of liquid L in contactor section C.

The gas leaving hood 27 and carrying a now substantially reduced quantity of scrubbing liquid will enter secondary separator section $S_2$ wherein the gas is again forced to change direction and caused to flow downwardly into nozzles 32 through the annular space between the nozzles and the lower ends of risers 34 in order to enter the open lower ends of risers 34. Vanes 35 again impart a swirling motion to the gas flowing therethrough before passing into the lower ends of risers 34, the gas being preferentially directed into the risers by reason of the greater restriction provided by restricted openings 33. The centrifugal force imparted to the gas at this point and the necessary changes in direction cause separation of additional quantities of liquid from the gas and this liquid will drain through the openings 33 and will fall on plate 21 outside hood 27 whence the separated liquid will drain through downcomer 31 back into the main body of liquid L in the contactor section. The repeated whirling movements imparted to the gas and the numerous changes in direction thereof in passage through the primary and secondary separator sections will normally be sufficient to remove all but insignificant traces of liquid from the gas, so that the gas leaving secondary separator $S_2$ through the upper ends of risers 34 will be sufficiently clean and free of scrubbing liquid that it may be conducted directly to the scrubber discharge connection 11. Any additional liquid which may separate from the gas leaving the upper ends of risers 34 will fall on the top of the plate 23 and collect in well 36 whence it will flow through downcomer 38 back into the body of liquid L in contactor section C.

By means of the above-described scrubber, highly efficient scrubbing of gas may be accomplished with minimum loss of scrubbing liquid. The described scrubber operates with a relatively small pressure drop and has capacity for scrubbing exceptionally large volumes of gas.

It will be understood that various alterations and changes may be made in the details of the illustrative embodiment within the scope of the appended claims but without departing from the spirit of this invention.

What I claim and desire to secure by Letters Patent is:

1. A gas scrubber, comprising, a vertically disposed tubular vessel having a partition across its lower portion, means for introducing gas into said lower portion into intimate scrubbing contact with a body of a scrubbing liquid maintained therein, a conduit for discharging scrubbed gas from said lower portion to the upper portion of said vessel, and separator means for separating from said gas scrubbing liquid introduced therein by said scrubbing contact, said separator means comprising primary and secondary separator sections arranged in said vessel at successively higher elevations above said partition, a nozzle having a tangential discharge for introducing the scrubbed gas into the lower portion of said primary separator section, an upwardly tapering generally conical hood having its base surrounding said nozzle and communicating at its upper end with said secondary separator section, a helical baffle mounted on the inner wall of said hood, a plurality of flow-reversing discharge nozzles for discharging the gas from said secondary separator section to the upper portion of said vessel, means for discharging separated gas from the upper portion of said vessel, and means for returning scrubbing liquid separated in said separator sections to said body of scrubbing liquid.

2. A gas scrubber according to claim 1, wherein each of said flow-reversing discharge nozzles comprises, a vertically disposed tubular outer member having a flow restriction in its lower end, and a tubular inner member having its lower end concentrically extending into the upper portion of the bore of said outer member and having its upper end communicating with the portion of said vessel above said secondary separator section.

3. A gas scrubber according to claim 1, wherein each of said flow-reversing discharge nozzles comprises, a vertically disposed tubular outer member having a flow restriction in its lower end, a tubular inner member having its lower end concentrically extending into the upper portion of the bore of said outer member and having its upper end communicating with the portion of said vessel above said secondary separator section, and deflector means arranged in the annular space between said inner and outer tubular members to impart a centrifugal component to the gas passing downwardly through said annular space.

4. A gas scrubber, comprising, a vertically disposed tubular vessel, a series of longitudinally spaced partitions extending across the interior of said vessel to divide the same into a contactor section and primary and secondary separator sections at successively higher elevations in said vessel, means for introducing gas into said contactor section into intimate scrubbing contact with a body of a scrubbing liquid maintained in said contactor section, a conduit for discharging scrubbed gas from said contactor section toward said primary separator section, an upwardly tapering generally conical conduit extending through said primary separator section into communication with said secondary separator section, means for introducing the scrubbed gas tangentially into the lower portion of said conical conduit, baffle means mounted on the inner wall of said conical conduit for effecting a plurality of baffling contacts with the scrubbed gas passing therethrough to said secondary separator section, means arranged in said secondary separator section for imparting a plurality of direction changes to the gas passing therethrough, means for discharging the gas from said secondary separator means into the upper portion of said vessel, means for discharging gas from said upper portion of said vessel, and means for returning scrubbing liquid separated from said gas in said separator sections to said body of liquid in said contactor section.

5. A gas scrubber, comprising, a vertically disposed tubular vessel, a series of longitudinally spaced partitions extending across the interior of said vessel to divide the same into a contactor section and primary and secondary separator sections at successively higher elevations in said vessel, means for admitting gas into said contactor section into intimate scrubbing contact with a body of a scrubbing liquid maintained in said contactor section, a conduit for discharging scrubbed gas from said contactor section toward said primary separator section, an inlet nozzle for admitting said scrubbed gas into the lower end of said primary separator section, said nozzle having a tangential discharge, an upwardly tapering generally conical hood having its base surrounding said nozzle and communicating at its upper end with said secondary separator section, a helical baffle mounted on the inner wall of said hood, a plurality of discharge nozzles for discharging the scrubbed gas from said secondary separator section to the upper portion of said vessel, means arranged in said discharge nozzles to impart a plurality of direction changes to the gas passing therethrough, means for discharging the gas from the upper portion of said vessel, and means for returning scrubbing liquid separated from said gas in said separator sections to said body of liquid in said contactor section.

6. A gas scrubber, comprising, a vertically disposed tubular vessel, a series of longitudinally spaced partitions extending across the interior of said vessel to divide the same into a contactor section and primary and secondary separator sections at successively higher elevations in said vessel, said contactor section having a body of a scrubbing liquid maintained therein, a conduit for discharging scrubbed gas from the upper portion of said contactor section and having its lower end submerged beneath the surface of said body of liquid, means for introducing gas into said contactor section along a tangential path above said body of liquid and between the exterior of said conduit and the surrounding wall of said vessel, means carried by the submerged end of said conduit to effect intimate contact between said body of liquid and said gas in its passage to the interior of said conduit, an upwardly tapering generally conical conduit extending through said primary separator section into communication with said secondary separator section, means for introducing the scrubbed gas tangentially into the lower portion of said conical conduit, baffle means mounted on the inner wall of said conical conduit for effecting a plurality of baffling contacts with the scrubbed gas passing therethrough to said secondary separator section, means arranged in said secondary separator section for imparting a plurality of direction changes to the gas passing therethrough, means for discharging the gas from said secondary separator section into the upper portion of said vessel, means for discharging gas from said upper portion of said vessel, and means for returning scrubbing liquid separated from said gas in said separator sections to said body of liquid in said contactor section.

FRED G. LOVE.

REFERENCES CITED

The following references are of record in the file of this patent:

UNITED STATES PATENTS

| Number | Name | Date |
| --- | --- | --- |
| 1,920,437 | Sillers | Aug. 1, 1933 |
| 2,087,219 | Dorfan | July 13, 1937 |
| 2,102,705 | Henderson et al. | Dec. 21, 1937 |
| 2,354,677 | Fisher | Aug. 1, 1944 |